(No Model.) 2 Sheets—Sheet 2.
J. T. HODGINS.
CABLE GRIP DEVICE.
No. 408,203. Patented July 30, 1889.
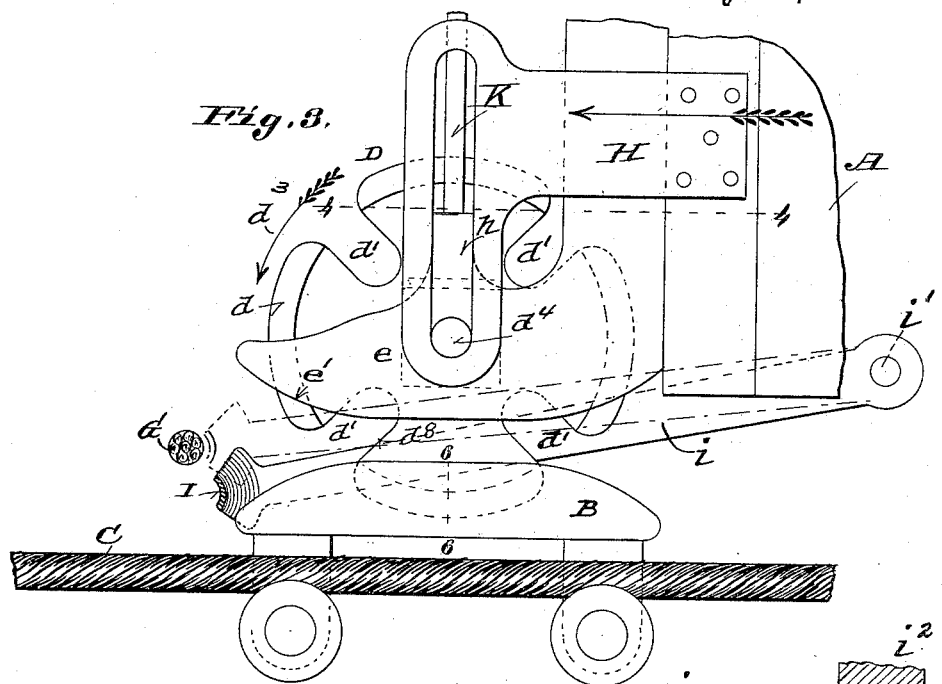
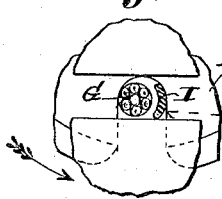
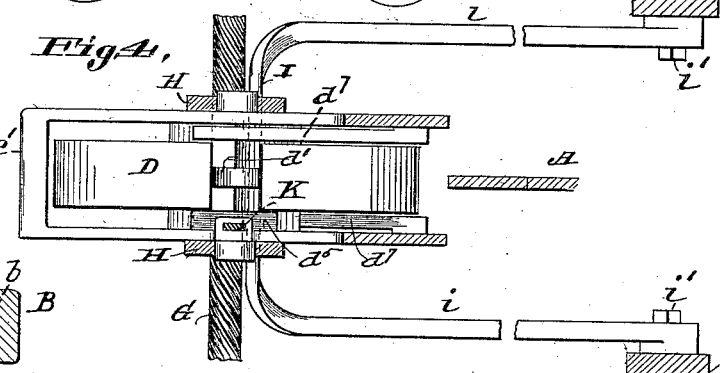
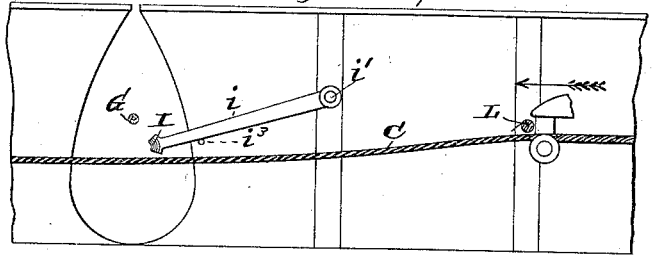
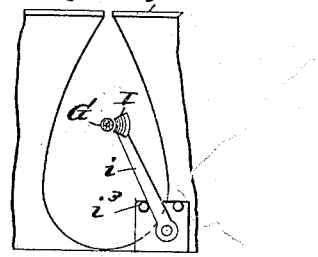
Attest:
Charles Pickles
J. W. Sanford
Inventor:
John T. Hodgins
by C. D. Moody, atty

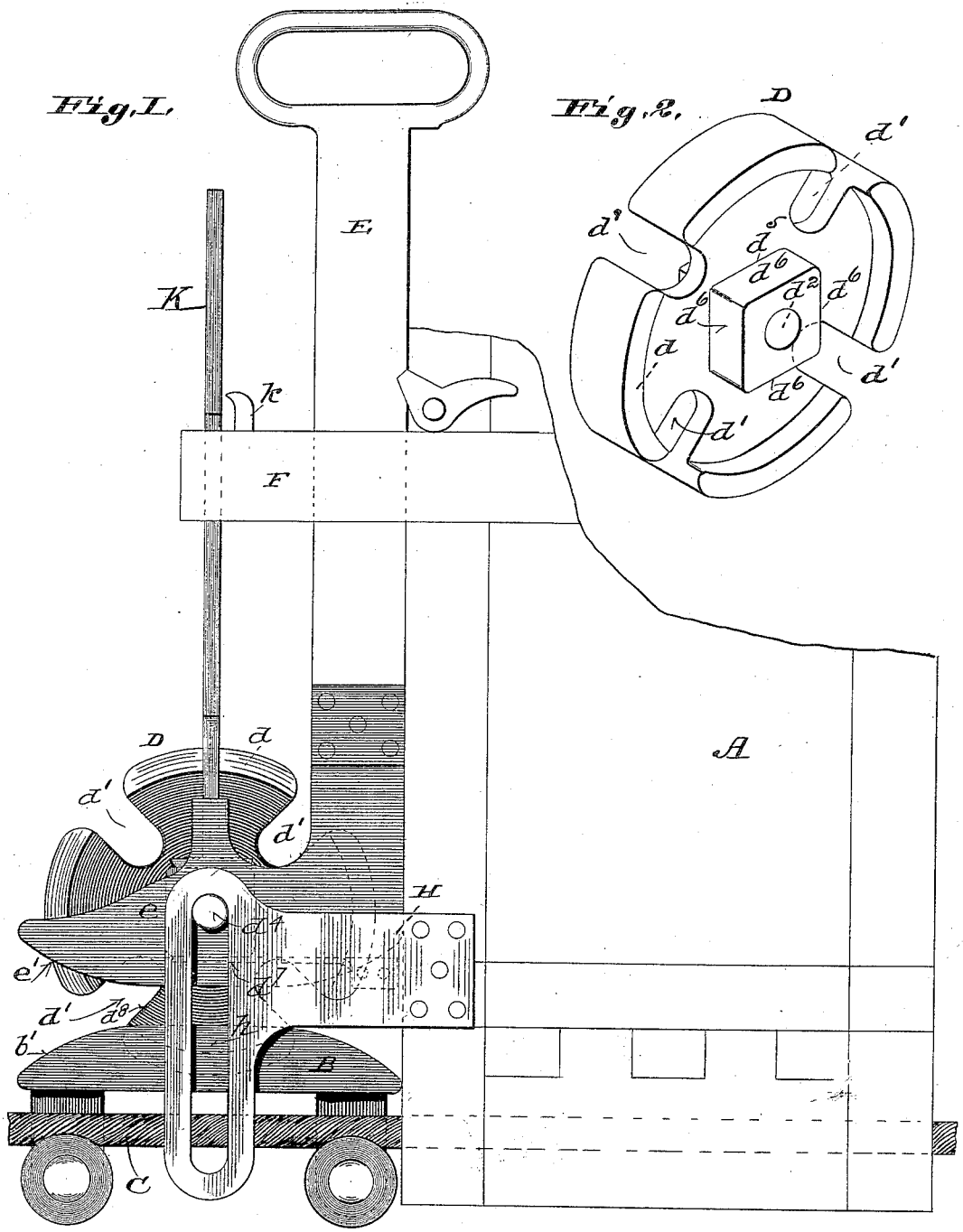

UNITED STATES PATENT OFFICE.

JOHN T. HODGINS, OF ST. LOUIS, MISSOURI, ASSIGNOR, BY DIRECT AND MESNE ASSIGNMENTS, OF FIVE-NINTHS TO SAMUEL G. HODGINS AND WILLIAM STROMBERG, BOTH OF SAME PLACE.

CABLE-GRIP DEVICE.

SPECIFICATION forming part of Letters Patent No. 408,203, dated July 30, 1889.

Application filed July 30, 1888. Serial No. 281,439. (No model.)

*To all whom it may concern:*

Be it known that I, JOHN T. HODGINS, of St. Louis, Missouri, have made a new and useful Improvement in Cable-Grip Devices, of which the following is a full, clear, and exact description.

Letters Patent of the United States, No. 386,585, were granted July 24, 1888, to myself and Samuel G. Hodgins for an improvement in cable-grip devices, whereby a cable-car upon one line of railway and using a lower cable can cross another (upper) cable without letting go of its own cable.

The leading feature of the construction referred to is the combination of a holder for the lower cable and a part above said holder and attached directly or indirectly to the car, said upper part and said holder being so relatively shaped and connected that the upper cable can pass between them without having to disconnect said holder from said upper part.

The present improvement is related to the one referred to in that substantially the above-described combination of parts is employed; and it consists, substantially, as is hereinafter more fully set out and claimed, aided by a reference to the annexed drawings, making part of this specification, in which—

Figure 1 is a side elevation of the cable-holder, the part above and turning in the cable-holder, and that portion of the grip which is more directly connected with the cable; Fig. 2, a view in perspective of the part which is directly connected with and sustains the cable-holder; Fig. 3, a side elevation of the improved device; Fig. 4, a horizontal section on the line 4 4 of Fig. 3; Fig. 5, a detail, being a side elevation of that portion of the construction with which the (crossed) cable and guard come immediately in contact. The cable and guard are shown in cross-section. Fig. 6 is a vertical cross-section on the line 6 6', Fig. 3; Fig. 7, a vertical longitudinal section of a cable-conduit containing the improvement; and Fig. 8, a similar section, but showing a modification of the guard-support.

The views are upon various scales, and the same letters of reference denote the same parts.

The grip A is of a familiar form and is operated in the customary manner.

B represents the holder for the (lower) cable C. It is constructed as in the original device. The part D, which sustains and coacts with the holder B, is similar in its construction and operation to that of the part D' of the original device, saving that in the place of its being segmental in its general form and in its operation having a reciprocating movement, it is circular in form and has a rotary movement. It is flanged, substantially as shown at $d$, and notched, substantially as shown at $d'$, and it is perforated centrally at $d^2$ to adapt it to be rotated in the groove $b$, Fig. 6, in the holder B, and in its operation the part D revolves continuously on its bearing in one direction as, indicated by the arrow $d^3$, Fig. 3.

The preferred means for raising and lowering the part D and holder B with relation to the grip A is by means of the handle E. The handle works vertically in guides F H upon the grip or any suitable part of the car, and the holder B and part D, adjusted as indicated by their two positions shown, respectively, in Figs. 1 and 3. The part D, by means of the shaft or pin $d^4$, Figs. 1, 3, and 4, is journaled in a forwardly-extended arm $e$ of the handle E. This arm serves another purpose. It is extended forward beyond the journal $d^4$ and at $e'$ is curved upward to form a part which coacts with the rounded surface $b'$ upon the holder B in directing the cable G and guard I properly between the holder B and the part D, and into that one of the notches $d'$ in the part D which is in position to receive them.

To cause the part D to always have a notch $d'$ presented to receive the guard and cable, the part D is provided with the projection $d^5$, having as many faces $d^6$ as there are notches $d'$, and relatively arranged thereto, and a spring $d^7$ coacts with the faces $d^6$ to adjust and steady the part D. The guide H is slotted at $h$ to provide for the adjustment of the holder B and part D.

I, Figs. 3, 4, 5, 7, and 8, represents the guard, which, as stated, is a leading feature of the improved device. It is the part which, in the forward movement of the car, is encountered by the holder B, part D, and especially by the side $d^8$ of the notch $d'$ in the part D as the cable G is crossed. It is some such part as a metallic bar or rod of sufficient strength to withstand the shock of the moving parts, and it is of suitable size and shape to be admitted jointly with the cable G into that one of the notches $d'$ which for the time being is in use—that is, as the cable G is approached the side $d^9$ of the notch $d'$ strikes the guard, and the part D is in consequence rotated on its journal, and the cable G, as well as the guard, is received into the notch with but slight, if any, shock to or wear upon the cable G. The guard continues to cause the part D to revolve until the cable has passed to the rear of the part D. The shape of the notch $d'$ is adapted to the reception of the cable without materially, if at all, binding upon it. As the cable G has usually some slight vibration, from its generally being in use at the time of its being crossed, it is desirable to have the guard so that it can be adjusted exactly to the position of the cable G. It is also necessary to provide for the passage of the grips along the cable G. To these ends the guard is made adjustable toward and from the cable G—that is, either closely in front of it as the part D is to pass the cable G, or sufficiently from it for a grip upon the cable G to pass the guard. As the most desirable means for this purpose, the guard is attached to arms $i$, which at $i'$ are journaled to bearings $i^2$ in the conduit J. This enables the guard to be moved substantially as is indicated by the two positions shown respectively in full and broken lines in Fig. 3. The stop $i^3$, Fig. 7, limits the movement of the guard. As the holder B comes along, it moves the guard and adjusts it into line with the cable. In Fig. 8 another way of holding the guard is shown. The guard is useful as a protection of the cable G, irrespective of the use of the holder and part D.

K, Figs. 1 and 3, represents a part styled "an indicator." It is a part attached to the arm $e$, or some other part therewith, or with the part D, vertically moving and extending upward, to be seen by the person operating the grip. A finger $k$, or equivalent means, is employed to mark the exact vertical adjustment of the indicator. By this means the gripman can accurately determine the location of the parts B D. In the event the gripman fails to properly operate his grip on approaching the cable G, that cable is liable to be struck and injured. To prevent this, a bar or rope L, Fig. 7, may be, and preferably is, stretched across the conduit J at a level to be encountered by the grip A. This serves to arrest the movement of the grip and its car, perhaps to its injury, but so as to guard the cable G from being struck and injured. When the grip A is opened, the cable C drops and the rope L passes between the holder B and the part D in manner similar to the passage of the guard I.

I claim—

1. The combination of the adjustable guard and the holder B and part D, substantially as described.

2. The combination of the holder B, the part D, and the handle E, having the curve $e'$, substantially as described.

3. The combination of the grip, the handle, the guides, the part D, and the holder, substantially as described.

4. The combination of the grip, the two cables, the holder B, the circular part D, as described, the handle E, and the guard, substantially as described.

5. The combination of the indicator K, the part D, and the holder B, substantially as and for the purpose set forth.

6. The fixed rope F, extending across the conduit, as and for the purpose described.

7. The combination of the conduit, the cables C G, the rope F, the guard I, the grip A, the holder B, and the part D, substantially as described.

Witness my hand, July 27, 1888.

JOHN T. HODGINS.

Witnesses:
C. D. MOODY,
FRANCIS VALLÉ.